US009838225B1

(12) United States Patent
Iranzo Molinero et al.

(10) Patent No.: US 9,838,225 B1
(45) Date of Patent: Dec. 5, 2017

(54) CHANNEL ESTIMATION USING DATA FRAMES

(71) Applicant: Marvell International Ltd., Hamilton (BM)

(72) Inventors: Salvador Iranzo Molinero, Valencia (ES); Alberto Riera Sanchez, Valencia (ES); Vicente Grau Orti, Valencia (ES); Antonio Salas Moreno, Valencia (ES)

(73) Assignee: Marvell International Ltd., Hamilton (BM)

( * ) Notice: Subject to any disclaimer, the term of this patent is extended or adjusted under 35 U.S.C. 154(b) by 21 days.

(21) Appl. No.: 14/838,902

(22) Filed: Aug. 28, 2015

Related U.S. Application Data

(60) Provisional application No. 62/044,834, filed on Sep. 2, 2014.

(51) Int. Cl.
H04B 7/02 (2017.01)
H04L 25/02 (2006.01)
H04L 5/00 (2006.01)
H04B 17/336 (2015.01)

(52) U.S. Cl.
CPC ....... *H04L 25/0204* (2013.01); *H04B 17/336* (2015.01); *H04L 5/0007* (2013.01); *H04L 5/0023* (2013.01); *H04L 5/0046* (2013.01)

(58) Field of Classification Search
CPC ... H04L 5/0094; H04L 5/0046; H04L 5/0007; H04L 43/08; H04L 5/006; H04L 27/2608; H04L 27/2647; H04L 27/0012; H04L 5/023; H04L 2012/6478; H04L 5/0085; H04M 3/304; H04M 3/302; H04M 3/306
USPC ............... 375/260, 219, 222, 231, 257, 267; 370/480, 334, 485; 379/32.04, 1.04, 379/22.08, 27.01, 27.09
See application file for complete search history.

(56) References Cited

U.S. PATENT DOCUMENTS

| 6,205,410 B1 * | 3/2001 | Cai ..................... H04L 27/2608 370/364 |
| 2009/0154927 A1 * | 6/2009 | Oksman ................ H04L 5/0037 398/76 |
| 2011/0194636 A1 * | 8/2011 | Monk ................... H04L 5/0007 375/260 |

* cited by examiner

*Primary Examiner* — Rahel Guarino

(57) ABSTRACT

Aspects of the disclosure provide a receiver. The receiver includes a receiving (Rx) estimation controller configured to set a bit load of a subcarrier in a bit allocation table (BAT) at a transmitter, a receiving unit configured to receive, from the transmitter, a bit sequence that is loaded to the subcarrier based on the bit load of the subcarrier in the BAT wherein the bit sequence is transmitted through a channel from the transmitter to the receiving unit, and a channel estimator configured to estimate a condition of the channel based on the bit sequence that is loaded to the subcarrier.

18 Claims, 8 Drawing Sheets

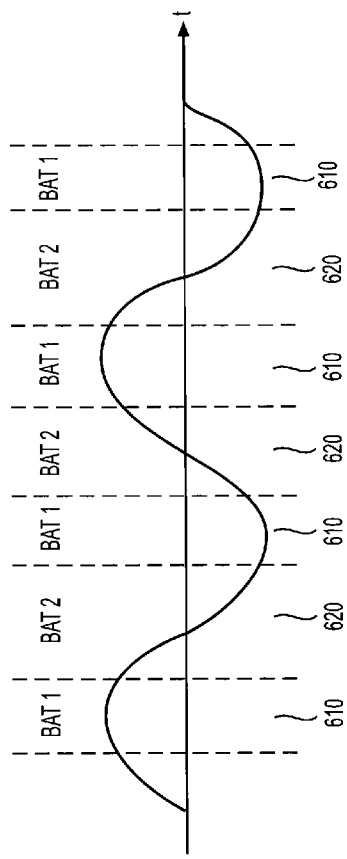

CHANNEL ESTIMATION USING DATA FRAMES

INCORPORATION BY REFERENCE

This present disclosure claims the benefit of U.S. Provisional Application No. 62/044,834, "Channel Estimation Using Data Frames" filed on Sep. 2, 2014, which is incorporated herein by reference in its entirety.

BACKGROUND

Orthogonal Frequency Division Multiplexing (OFDM) is a special form of multi-carrier transmission technique in which a single high rate data stream is divided into multiple low rate data streams. These data streams are then modulated using subcarriers which are orthogonal to each other. In an OFDM transmission system, each subcarrier is attenuated individually under the frequency-selective and fast fading channel. Modulation schemes adapted to the signal to noise ratio (SNR) of the individual subcarriers can be employed to improve the performance and data throughput of an OFDM transmission system. A key task performed in an adaptive OFDM transmission system is channel estimation.

SUMMARY

Aspects of the disclosure provide a receiver. The receiver includes a receiving (Rx) estimation controller configured to set a bit load of a subcarrier in a bit allocation table (BAT) at a transmitter, a receiving unit configured to receive, from the transmitter, a bit sequence that is loaded to the subcarrier based on the bit load of the subcarrier in the BAT wherein the bit sequence is transmitted through a channel from the transmitter to the receiving unit, and a channel estimator configured to estimate a condition of the channel based on the bit sequence that is loaded to the subcarrier.

In an embodiment, the receiving estimation controller is configured to set the bit load of the subcarrier in the bit allocation table (BAT) at the transmitter to perform a channel estimation for the subcarrier, and wherein the channel estimator is configured to estimate a condition of the channel for the subcarrier based on the bit sequence that is loaded to the subcarrier.

In an embodiment, the Rx estimation controller is configured to set the bit load of the subcarrier in the BAT to a predetermined value, and the bit sequence that is loaded to the subcarrier based on the bit load of the predetermined value in the BAT is a bit sequence known to the receiver. In another embodiment, the Rx estimation controller is configured to set the bit load of the subcarrier in the BAT to a non-predetermined value, and the bit sequence that is loaded to the subcarrier based on the bit load of the non-predetermined value in the BAT is a regular bit sequence (RBS).

In an embodiment, the Rx estimation controller is configured to set multiple bit loads of multiple subcarriers in the BAT at the transmitter to perform channel estimations for each of the multiple subcarriers.

In an embodiment, the channel estimator is configured to calculate a signal-to-noise ratio (SNR) for each of the multiple subcarriers in the BAT to estimate the condition of the channel for the subcarrier. In addition, the receiver further includes a bit load calculator that is configured to calculate a bit load for each of the multiple subcarriers in the BAT based on the SNRs calculated by the channel estimator to generate a bit load setting (BLS) for the BAT, and the Rx estimation controller is further configured to transmit the BLS to the transmitter to update the BAT at the transmitter.

In an embodiment, the Rx estimation controller is configured to send a BLS updating message to the transmitter to set the bit load of the subcarrier in the BAT at the transmitter, and the BLS updating message including a BAT identification of the BAT and a BLS specifying the subcarrier in the BAT. In an embodiment, the Rx estimation controller is configured to set bit loads of subcarriers in a subcarrier group of the BAT that uses subcarrier grouping to perform the channel estimation for the subcarriers.

In an embodiment, the Rx estimation controller is configured to set a next bit load of a next subcarrier in the BAT at the transmitter to perform a next channel estimation for the next subcarrier. In other words, a process of channel estimation may include multiple steps and in each step channel conditions of one or more subcarriers are estimated.

In an embodiment, the channel estimator is configured to select the bit sequence that is loaded to the subcarrier from a data frame received at the receiving unit based on a BAT identification of the BAT and a BLS specifying the subcarrier in the BAT, the BAT identification of the BAT and the BLS being received from the Rx estimation controller.

In an embodiment, the Rx estimation controller is configured to set a bit load of a subcarrier in the BAT at the transmitter to perform a first channel estimation for the subcarrier when a first multiple-input and multiple-output (MIMO) mode is chosen for the subcarrier and set a bit load of the subcarrier in the BAT at the transmitter to perform a second channel estimation for the subcarrier when a second MIMO mode is chosen for the subcarrier. In addition, the Rx estimation controller is configured to subsequently choose the first MIMO mode for the subcarrier in the BAT if a first bit load of the subcarrier in the BAT calculated based on the first channel estimation is higher than a second bit load of the subcarrier in the BAT calculated based on the second channel estimation. Further, the channel estimator is configured to calculate a first SNR for the subcarrier in the BAT corresponding to the first channel estimation and a second SNR for the subcarrier in the BAT corresponding to the second channel estimation. Furthermore, the receiver further includes a bit load calculator that is configured to calculate the first bit load of the subcarrier in the BAT corresponding to the first MIMO mode based on the first SNR and the second bit load of the subcarrier in the BAT corresponding to the second MIMO mode based on the second SNR.

Aspects of the disclosure provide a method. The method includes setting a bit load of a subcarrier in a bit allocation table (BAT) at a transmitter, receiving from the transmitter a bit sequence that is loaded to the subcarrier based on the bit load of the subcarrier in the BAT wherein the bit sequence is transmitted through a channel from the transmitter to the receiving unit, and estimating a condition of the channel based on the bit sequence that is loaded to the subcarrier.

BRIEF DESCRIPTION OF THE DRAWINGS

Various embodiments of this disclosure that are proposed as examples will be described in detail with reference to the following figures, wherein like numerals reference like elements, and wherein:

FIG. 4 shows a BAT that is used for a blind channel estimation according to an embodiment of the disclosure;

FIG. 5 shows a BAT using subcarrier grouping according to an embodiment of the disclosure;

FIG. 6 shows multiple BAT regions in alternating current (AC) cycles according to an embodiment of the disclosure;

DETAILED DESCRIPTION OF EMBODIMENTS

Figure 1:
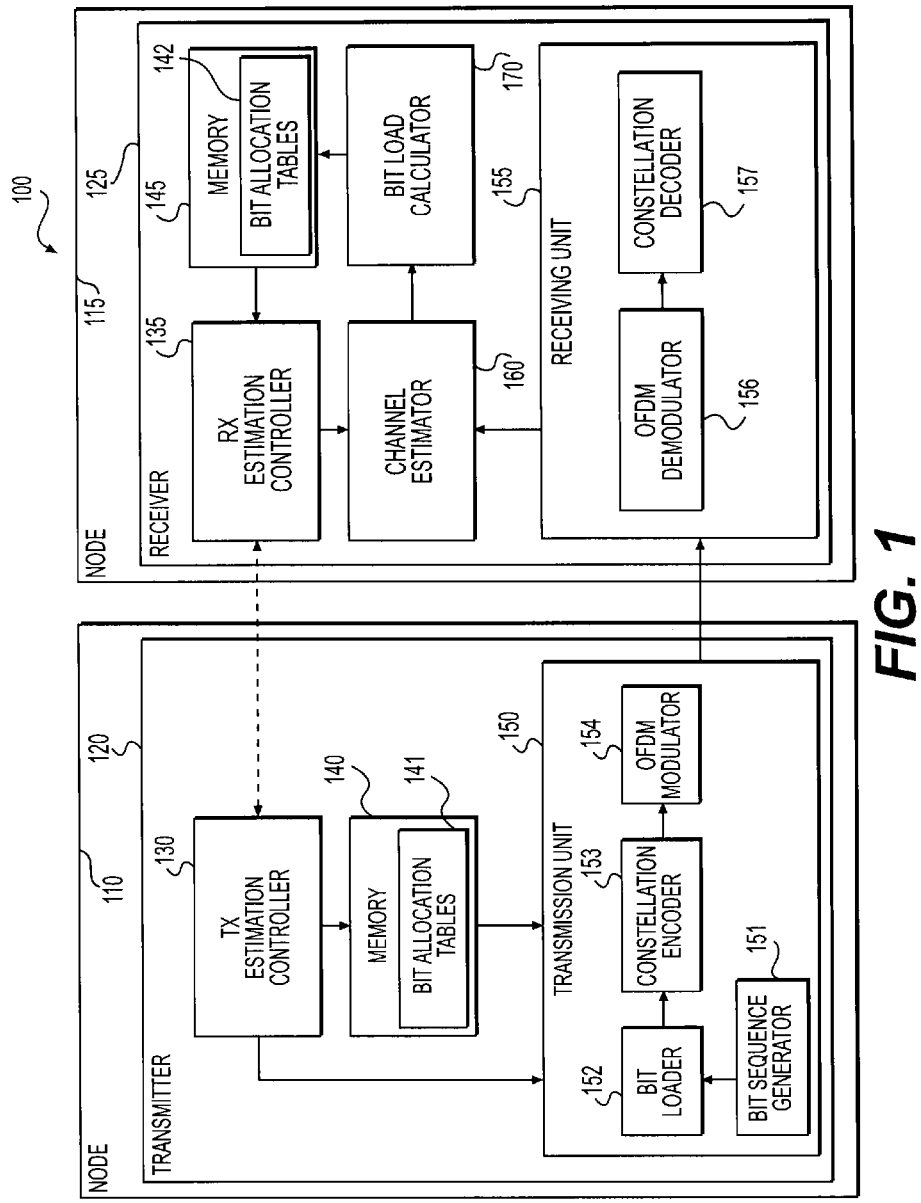
FIG. 1 shows a communication network according to some embodiments of the disclosure.

FIG. 1 shows a communication network 100 according to some embodiments of the disclosure. The network 100 includes a first node 110 and a second node 115. The first node 110 includes a transmitter 120 and the node 115 includes a receiver 125. The transmitter 120 includes a transmission (Tx) estimation controller 130, a memory 140 storing one or more bit allocation tables (BATs) 141, and a transmission unit 150 that includes a bit sequence generator 151, a bit loader 152, a constellation encoder 153, and an orthogonal frequency-division multiplexing (OFDM) modulator 154. The receiver 125 can include a receiving (Rx) estimation controller 135, a channel estimator 160, a bit load calculator 170, a memory 145 storing one or more BATs, and a receiving unit 155 that includes an OFDM demodulator 156 and a constellation decoder 157. The above mentioned elements are coupled together as shown in FIG. 1.

Each of the nodes 110 and 115 can be a computer, a mobile device, a modem, and the like in various embodiments. As shown, the first node 110 and the second node 115 communicate with each other via a communication channel. Specifically, the first node 110 uses the transmitter 120 to transmit data to the second node 115, and the second node 115 uses the receiver 125 to receive data from the first node 110. The communication channel used for data transmission between the nodes 110 and 115 can be power lines, phone lines, coaxial cables, and the like. Alternatively, the nodes 110 and 115 can communicate wirelessly. In some embodiments, the nodes 110 and 115 are equipment based on the ITU G.hn standard. G.hn is the common name for a group of home network technology standards and the G.hn specifications define networking over power lines, phone lines and coaxial cables.

A multiple-carrier modulation (MCM) scheme, such as OFDM modulation, is used for the data transmission in the FIG. 1 example. In MCM, a broad frequency spectrum band is divided into multiple narrow carriers, referred to as subcarriers; a data stream is divided into several data streams, and each subcarrier is modulated by one of the data streams to transmit the data. In an embodiment, the OFDM modulation is used. OFDM modulation uses a plurality of closely spaced orthogonal subcarriers to carry data on multiple data streams. Each subcarrier is modulated with modulation schemes such as quadrature amplitude modulation, phase-shift keying, or the like. An OFDM signal includes successively transmitted OFDM symbols, and each symbol includes multiple subcarriers.

An adaptive modulation scheme is also used for the data transmission in the FIG. 1 example. Adaptive modulation dynamically adapts modulation parameters to conditions of a channel through which the data is transmitted. Using adaptive modulation together with the MCM scheme in the FIG. 1 example, the transmitter 120 uses different modulation schemes for different subcarriers according to a bit allocation table (BAT) which reflects the channel conditions of each subcarrier. The BAT defines a number of bits, referred to as a bit load, for each subcarrier in an OFDM signal and the bit loads are calculated based on a measure of signal-to-noise ratio (SNR) of each subcarrier. For example, after a channel estimation, a first subcarrier channel is found to have a low SNR, and a second subcarrier channel is found to have a high SNR. Accordingly, a low bit load, e.g., 2 bits, can be assigned to the first subcarrier while a high bit load, e.g., 4 bits, can be assigned to the second subcarrier. During the modulation operation, the transmitter 120 can use a modulation scheme with a low modulation level, such as the quadrature phase-shift keying (QPSK) for the first subcarrier that has a low channel quality. In contrast, the transmitter 120 can use a modulation scheme with a high modulation level, such as the 16 quadrature amplitude modulation (16-QAM) for the second subcarrier that has a higher channel quality.

As described above, the channel estimation for each subcarrier needs to be performed to facilitate the adaptive modulation. Generally, channel estimation refers to the process determining channel conditions of a communication link. Channel conditions describe how a signal propagates from a transmitter to a receiver and represents the combined effect of, for example, scattering, fading, and/or power decay with distance. Channel conditions may change with time, thus channel estimation needs to be performed periodically to adapt data transmission to current channel conditions.

In an embodiment, the BAT is established at the initial stage of the communication between the nodes 110 and 115. For example, at the initial stage of the communication, a default BAT known to the nodes 110 and 115 can be used to perform the data transmission. Then, the receiver 125 can request the transmitter 120 to send one or more probe frames to perform a channel estimation. A probe frame carries bit sequences that are known to the receiver 125, referred to as training sequences, thus the receiver 125 can perform channel estimation by comparing the received training sequences with the known bit sequences. Particularly, SNRs of each subcarrier can be obtained from the channel estimation. Subsequently, a new set of bit loads for the subcarriers can be calculated based on the SNRs. Finally, a new BAT reflecting the channel conditions can be generated to substitute the default BAT.

After a BAT is established, the BAT needs to be updated when channel conditions change. According to an aspect of the disclosure, the BAT can be first used to perform channel estimation and subsequently SNRs obtained from the channel estimation can be used to update the BAT. Specifically, in the FIG. 1 example, the receiver 125 can change bit load settings (BLSs) of a BAT that is being used at the transmitter 120 such that training sequences can be embedded into the subcarriers in the OFDM signal, thus channel estimation can be performed based on the received training sequences. A BLS refers to the bit loads defined for subcarriers in the BAT. Usually, when channel conditions change, the BLS of a BAT needs to be updated to reflect the new channel conditions for the purpose of adaptive modulation. However, when used for channel estimation, the BLS of a BAT is changed for transmitting training sequences.

For example, in the FIG. 1 example, in order to use a BAT to perform channel estimation, at the receiver 125, the Rx estimation controller 135 can send a BLS updating message to the transmitter 120 to set bit loads of one or more subcarriers to a predetermined value, such as zero, in the BAT. At the transmitter 120, when performing adaptive modulation, the transmission unit 150 can load training sequences that are known to the receiver 125 to the subcarriers that have a bit load of zero based on the BAT. At the receiver 125, the channel estimator 160 can receive the training sequences and compare the received training sequences with the known bit sequences to estimate channel conditions.

Referring to FIG. 1, the transmitter 120 receives application data generated by applications at the first node 110. For example, the application data can be Ethernet data frames or Internet protocol (IP) packets. In addition, the transmitter 120 itself generates management data for performing various functions of the transmitter 120, such as messages generated from the Tx estimation controller 130 or other components included in the transmitter 120 not shown in FIG. 1. The transmitter 120 processes the application data and the management data, such as encrypts, segments and assembles the application data and the management data, and transmits data including the application data and the management data to the transmission unit 150.

The transmission unit 150 receives the data generated at the transmitter 120 and transmits the data to the second node 115. At the transmission unit 150, the data to be transmitted is first encapsulated into a payload of a data frame, referred to as a physical layer (PHY) frame. In an embodiment, the PHY frame includes a payload and a header. The PHY frame header is used to carry control information, such as a BAT identification (ID), type of the frame and its length, parameters of forward error correction (FEC), and the like.

The PHY frame payload can include multiple symbols each to be transmitted over an OFDM symbol in an OFDM signal. In an example, the PHY frame can carry in its payload a training sequence known to the receiver 125 for the purpose of channel estimation. Such a PHY frame is referred to as the probe frame as mentioned above. Usually, the training sequence in a probe frame lasts for one or more OFDM symbols in an OFDM signal.

In an embodiment, the PHY frame is scrambled and FEC encoded, and then transmitted to the bit loader 152.

The bit loader 152 divides incoming data bits into groups of bits and associates each group of bits with a subcarrier. Specifically, in an embodiment, according to the BLS of a BAT, the bit loader 152 divides the bits into groups of bits and associates each group of bits with a specific subcarrier that is used to carry the group of bits. Such a group of bits is referred to as a regular bit sequence (RBS) in this detailed description of embodiments. A RBS includes data bits that carry information of the application data and management data, while a training sequence is a bit sequence used for channel estimation purpose.

As described above, a subcarrier whose bit load is set to a predetermined value in a BAT can be used for channel estimation purpose. In an embodiment, for the subcarrier whose bit load is set to a predetermined value in the BAT, such as zero, the bit loader 152 loads a training sequence known to the receiver 125 to the subcarrier in order to perform channel estimation. Such a training sequence carried in a subcarrier with a bit load of predetermined value in a BAT is referred to as a channel estimation bit sequence (CEBS) in this detailed description of embodiments. The bit sequence generator 151 can generate the CEBS according to a certain algorithm, such as a linear-feedback shift register (LFSR) algorithm. The choice of the algorithm can be based on a negotiation of the transmitter 120 and the receiver 125, thus known to both the transmitter 120 and the receiver 145. It is noted that the predetermined value for the bit load of a subcarrier is an indicator according to which the bit loader 152 loads a CEBS to the subcarrier, and the predetermined value can be any values in addition to zero. In addition, for different subcarriers in the BAT, multiple different predetermined values can be used in some embodiments.

In an embodiment, the bit loader 152 can use different BATs for processing different PHY frames; however, usually one BAT is used over all OFDM symbols included in the payload of one PHY frame.

The constellation encoder 153 matches each group of bits to a constellation point of a constellation diagram based on different modulation schemes. The constellation diagram represents signals modulated by a modulation scheme, such as QAM or PSK, as constellation points in a complex plane. Each constellation point (I, Q) corresponds to a complex number I+jQ, referred to as sub-symbols, that corresponds to a group of bits produced at the bit loader 152. The sub-symbols are outputted from the constellation encoder 153 and transmitted to the OFDM modulator 154. In addition, different numbers of bit loads in the BAT correspond to different modulation schemes. For example, for a bit load of 4 defined for a subcarrier, 16-QAM is used, while for a bit load of 8, 256-QAM modulation scheme is used.

The OFDM modulator 154 receives the sub-symbols from the constellation encoder 153 and modulates each subcarrier with each corresponding sub-symbol. In an embodiment, the OFDM modulator 154 can include an inverse fast Fourier transform (IFFT) module (not shown) that transforms the sub-symbols into a time-domain digital signal. Serial to parallel and parallel to serial conversions are performed before and after IFFT, correspondingly. Thereafter, a cyclic extension operation can be performed to add a cyclic prefix to decrease inter symbol and inter carrier interference caused by multipath propagation of the signal, and consequently OFDM symbols are produced. Next, the OFDM symbols generated from the OFDM modulator can be transmitted to an analog front end (AFE) (not shown) where a signal carrying the PHY frames is processed and transmitted to the second node 115 over the media or the air. In an example, the AFE includes a digital to analog converter, an analog filter, an up-converter and a power-amplifier.

At the second node 115, the receiving unit 155 receives the signal transmitted from the transmission unit 150. In an embodiment, the receiving unit 155 can include an AFE (not shown) that down-converts the received signal and performs analog to digital conversion to the received signal to generate the OFDM symbols. The OFDM demodulator 156 receives the OFDM symbols, removes the cyclic extension, and processes the signal with a fast Fourier transform (FFT) module (not shown) that transforms the signal in time domain to sub-symbols in frequency domain. Serial to parallel and parallel to serial conversions are performed before and after the FFT, correspondingly. The sub-symbols are fed to the constellation decoder 157 that matches the sub-symbols to data bits. In addition, the sub-symbols generated from the FFT module are provided to the channel estimator 160 for channel estimation purpose in an embodiment. Next, the receiving unit 155 performs FEC decoding and de-scrambling operations to the data bits and consequently recovers the PHY frame. Then, control information included in the PHY frame header is received at the receiving unit 155 being used for various data receiving operations. Data carried in the PHY frame payload is transmitted to the receiver 125. The receiver 125 processes the data to acquire the management data and application data. The management data is transmitted to the other components in the receiver 125, such as the Rx estimation controller 135, and the application data is transmitted to the second node 115 for further processing.

In an embodiment, the Rx estimation controller 135, the Tx estimation controller 130 and the channel estimator 160 collaboratively perform a channel estimation when triggered. The bit load setting (BLS) of a BAT is used in the channel estimation. The SNRs obtained from the channel estimation is used to update the BAT. The channel estimation can be triggered by a change of channel conditions. For example, when a change of the conditions of the communication channel between the nodes 110 and 115 takes place, and the receiver 125 can detect the change, for example, through pilot sequences carried in the payload of PHY frames. Alternatively, or additionally, in an example, the channel estimation can be performed periodically.

In an example, the channel estimation includes multiple steps. In each step, a BLS updating message is transmitted from the Rx estimation controller 135 to the Tx estimation controller 130. In the BLS updating message, a portion of the subcarriers in the BAT is set with a bit load of a predetermined value, such as a bit load of zero. Accordingly, channel estimations of the portion of the subcarriers are performed in each step. However, at the end of the channel estimation operation, an overall channel estimation of all subcarriers in the BAT can be completed by combining the channel estimation results of each step.

In FIG. 1, the Rx estimation controller 135 transmits a BLS updating message to the Tx estimation controller 130 in each step of the channel estimation after the channel estimation is triggered. It is noted that although not shown in FIG. 1, the transmitter 120 can also include a receiving unit similar to the receiving unit 155 to receive and process PHY frames transmitted from the second node 115. Similarly, the receiver 125 can also include a transmission unit similar to the transmission unit 150 to generate and transmit PHY frames to the first node 110. In an embodiment, the BLS updating message includes an identification (ID) of a BAT, referred to as a BAT ID, and a BLS that specifies certain subcarriers of the BAT whose bit loads are set to predetermined values for the purpose of channel estimation. In an embodiment, the BLS in the BLS updating message includes bit loads of part of the subcarriers in the BAT. In another embodiment, the BLS in the BLS updating message includes information of bit loads of all subcarriers in the BAT.

In an embodiment, the communication between the Rx estimation controller 135 and the Tx estimation controller 130 can be realized by sending messages that are included in the management data carried in the payload of PHY frames as described above. The Rx estimation controller 135 also transmits the BLS updating message to the channel estimator 160 in an embodiment.

The Tx estimation controller 130 receives the BLS updating message from the Rx estimation controller 135 and sets bit loads of subcarriers in the BAT that is stored in the memory 140. For example, based on the BLS updating message received from the Rx estimation controller 135, the Tx estimation controller 130 finds the BAT whose BAT ID is included in the BLS updating message in the memory 140, and sets the bit load to the predetermined value for each subcarriers specified in the BLS updating message. In addition, in each step of the channel estimation except the first step, when a BLS updating messages is received, the Tx estimation controller 130 restores the bit loads of the subcarriers who have been set with a bit load of the predetermined value based on a previous BLS updating message to their original values before the previous BLS updating message is received. Thus, the subcarriers who have been set a zero bit load based on a previous BLS updating message can be used to carry the regular bit sequences (RBS).

Additionally, in an embodiment, the Tx estimation controller 130 informs the bit loader 152 that a BAT has been updated, thus the CEBSs can be loaded to subcarriers according to the BAT. For example, the Tx estimation controller 130 can transmit a message to the bit loader 152, and consequently the bit loader 152 starts to use the updated BAT to perform bit loading operation. Alternatively, the bit loader 152 can be configured to periodically check status of the BATs stored in the memory 140. Once an update of BAT is detected, the bit loader uses the updated BAT to perform its operation.

The channel estimator 160 obtains the channel estimation bit sequences (CEBSs) from the receiving unit 155 and calculates channel estimation results in each step of the channel estimation. In an example, based on the BLS updating message received from the Rx estimation controller, the channel estimator 160 knows a channel estimation is required as well as which subcarriers carry the CEBSs in which BAT. When a PHY frame is received at the receiving unit 155, a BAT ID carried in the PHY frame header is transmitted to the channel estimator 160. Based on the BAT ID carried in the PHY frame header and the BAT ID included in the BLS updating message, the channel estimator 160 knows a PHY frame carrying the CEBSs has arrived. Then, the channel estimator 160 can select the CEBSs from the subcarriers of the received OFDM symbols in the PHY frame payload according the BLS included in the BLS updating message. Specifically, in an embodiment, the channel estimator 160 receives the sub-symbols (complex numbers I+jQ) from the output of the FFT module of the receiving unit 155, and selects the sub-symbols, which correspond to the CEBSs, at the subcarriers whose bit loads are set to the predetermined values according to the BLS in the BLS updating message.

Next, the channel estimator 160 calculates channel estimation results based on the obtained CEBSs for subcarriers carrying the CEBSs. In various embodiments, based on received CEBSs, the channel estimator 160 can perform various measurements, such as measurements of SNR, precoding angles, and the like. In an example, the channel estimator 160 compares the received sub-symbols corresponding to the CEBSs with the know value of the CEBSs, and calculates a SNR for subcarriers carrying the CEBSs in the OFDM signal.

At the end of the channel estimation, the channel estimator 160 combines the channel estimation results of each step into an overall channel estimation result. The overall channel estimation result includes channel estimation results of each subcarrier in the BAT that has been set with a bit load of the predetermined value in each step of the channel estimation. In an embodiment, the channel estimation results are SNRs of each subcarrier and the overall channel estimation result is provided to the bit load calculator 170. In addition, the BAT ID of the BAT used in the channel estimation is also provided to the bit load calculator 170.

The bit load calculator 170 receives the SNR of each subcarrier and the BAT ID of the BAT used in the channel estimation from the channel estimator 160 and calculates a bit load for each subcarrier based on received SNR of each subcarrier. The calculation can be based on an algorithm that considers multiple factors, such as SNR of subcarriers, error bit rate (EBR), encoding schemes employed at the transmitter 120, transmission power, data rate, and the like, and optimally set a bit load for each subcarrier. The calculated bit loads of each subcarrier in the BAT forms a BLS that is then used to update the BAT that has been used for channel estimation as described above.

The BAT has an original BLS before the channel estimation is triggered. Such a BAT with the original BLS is referred to as the original BAT. After the channel estimation is triggered, the BLS of the BAT at the receiver 120 is changed with the BLS included in the BLS updating message. Such a BAT with the changed BLS is referred to as a modified BAT. The original BAT has two copies stored in the memory 140 and 145, respectively. The bit load calculator 170 stores the calculated bit loads into the original BAT stored in the memory 145 to update the original BAT. Thus the original BAT becomes an updated BAT. Subsequently, the receiver 125 transmits a BAT updating message including the calculated bit loads and the BAT ID of the BAT to the transmitter 120 to update the copy stored in memory 140. For example, the BAT updating message can be included in the management data described earlier and encapsulated into a PHY frame and transmitted to the transmitter 120. The transmitter 120 receives the BAT updating message and substitutes the BLS of the original BAT in the memory 140 with the calculated bit loads. Thus, the original BAT becomes an updated BAT. Subsequently, the bit loader 152 uses the updated BAT to perform the adaptive modulation for data transmission.

In various embodiments, the elements included in the transmitter 120 and the receiver 125 can be implemented with any suitable software, hardware or combination of software and hardware, and can be implemented as separate components or integrated into one or more integrated circuit (IC) such as application-specific integrated circuits (ASIC), field-programmable gate arrays (FPGA) or any other suitable types of IC. In various embodiments, the memories 140 and 145 can be cache, flash memory, random access memory (RAM), magnetic storage, optical storage, and the like.

In another channel estimation scheme, pilot sequences carried in subcarriers are used. Compared with the channel estimation scheme described above, the pilot sequences usually are always present in PHY frames, but in the channel estimation scheme described above, the channel estimation can be based on a request and triggered by a change of channel conditions, and the CEBSs can be present for short periods of time. In addition, the pilot sequences usually are used for aiding the demodulation of the same PHY frame that carries the pilot sequences, but in the channel estimation scheme described above, the CEBSs can be used to estimate SNRs of each subcarrier for generating a new BAT, and subsequently the new BAT is used for subsequent data transmission.

Figures 2A, 2B, 2C:
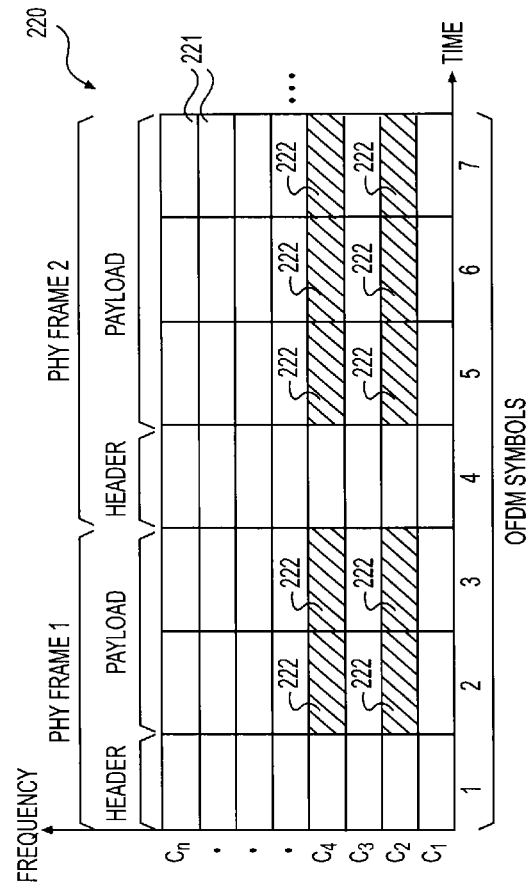
FIGS. 2A-2C show two bit allocation tables (BATs) and an OFDM signal according to some embodiments of the disclosure.

FIGS. 2A-2C show two bit allocation tables (BATs) 210 and 212, and an OFDM signal 220 according to some embodiments of the disclosure. The BAT 210, referred to as an original BAT, is generated during an initial stage of the communication between the nodes 110 and 115, or from a previous channel estimation. The BAT 210 is used by the transmission unit 150 to perform adaptive modulation. As shown, the BAT 210 includes a list of subcarrier indexes $C_1$-$C_n$ indicating the subcarriers used for data transmission, for example, between the nodes 110 and 115, and a list of bit loads $b_1$-$b_n$ each respectively defining a number of bits to be carried by the subcarriers $C_1$-$C_n$ in one OFDM symbol. The BAT 212, referred to as a modified BAT, is similar as the original BAT but a portion of the subcarriers is set with a bit load of a predetermined value in order to be used by the bit loader 152 to perform channel estimation. For example, the bit loads of the subcarriers $C_2$ and $C_4$ are set to zero.

The OFDM signal 220 includes a sequence of OFDM symbols along the time axis, such as the seven OFDM symbols numbered with 1-7, and each symbol includes multiple subcarriers with indexes $C_1$-$C_n$ along the frequency axis. Each subcarrier in an OFDM symbol corresponds to a block in the FIG. 2C, such as blocks 221. In the FIG. 2C example, the OFDM signal carries two PHY frames. The first PHY frame, labeled as PHY frame 1 in the FIG. 2C, includes a PHY header that is carried in the OFDM symbol 1, and a payload that is carried in the OFDM symbols 2 and 3. The second PHY frame, labeled as PHY frame 2 in the FIG. 2C, includes a PHY header that is carried in the OFDM symbol 4, and a payload that is carried in the OFDM symbols 5-7.

In the FIG. 2C example, the OFDM signal 220 is generated based on the modified BAT 212. For example, as requested by the Rx estimation controller 135, the TX estimation controller 130 modifies the original BAT 210 stored in the memory 140 based on a BLS updating message received from the Rx estimation controller 135, and the modified BAT 212 is generated and stored in the memory 140. The Tx estimation controller 130 informs the bit loader 152 of the modification. Subsequently, the bit loader 152 starts to use the modified BAT 212 to perform bit loading operation. Specifically, for each subcarrier $C_2$ and $C_4$ with a bit load of zero, a channel estimation bit sequence (CEBS) is loaded to the subcarriers corresponding to the blocks 222 that are included in the payload OFDM symbols 2, 3, and 5-7. For each subcarrier with a bit load of non-zero, a regular bit sequence (RBS) is loaded to the subcarriers included in the payload OFDM symbols 2, 3, and 5-7.

As shown in the FIG. 2C, during the channel estimation, the modified BAT 212 is used for a time period during which one or more PHY frames may be transmitted.

Figures 3A, 3B:
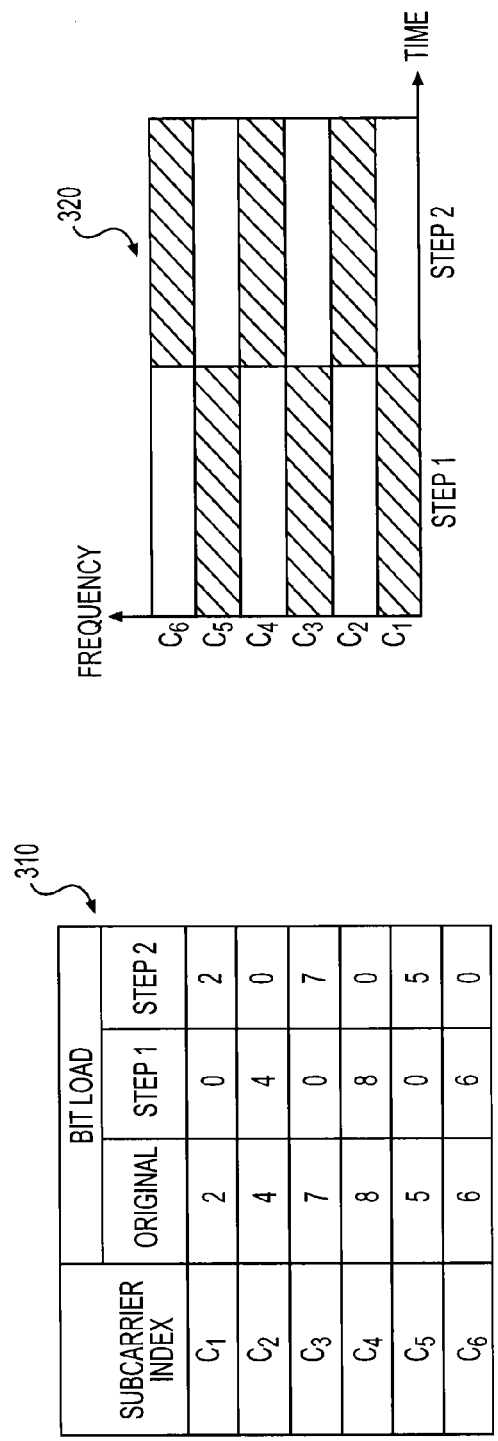
FIGS. 3A-3D show two channel estimations using bit load settings (BLSs) of BATs according to some embodiments of the disclosure.

FIGS. 3A-3D show two channel estimations using BLSs of BATs according to some embodiments of the disclosure. FIG. 3A shows a BAT 310 having three different BLSs. The BAT 310 has six subcarriers labeled with subcarrier indexes $C_1$-$C_6$. The second column shows an original BLS that can be the result of a previous channel estimation. Triggered by a change of channel conditions, for example, the Rx estimation controller 135 starts a channel estimation. The process can include two steps. During the first step, a first portion of the subcarriers, such as the carriers $C_1$/$C_3$/$C_5$, are set with a bit load of a predetermined value, such as zero, for the purpose of channel estimation. During the second step, a second portion of the subcarriers, such as the carriers $C_2$/$C_4$/$C_6$, are set with a bit load of a predetermined value, such as zero, for the purpose of channel estimation. Thus, the third and fourth column show the two modified BLSs corresponding to the first step and the second step of the channel estimation, respectively.

FIG. 3B shows an OFDM signal 320 that is adaptively modulated using the BAT 310. The subcarriers $C_1$-$C_6$ in the BAT 310 are shown along the frequency axis, and the OFDM signal 320 is divided into two areas, corresponding to the first step and the second step of the channel estimation, respectively, along the time axis. It is noted that the step 1 or step 2 areas may include multiple PHY frames, but the PHY frames are not shown for brevity. As shown, during the first step, the subcarriers $C_1/C_3/C_5$ (shaded in the FIG. 3B) are loaded with the CEBSs because the bit loads of the subcarriers $C_1/C_3/C_5$ are set to zero in the BAT 310, while the subcarriers $C_2/C_4/C_6$ (not shaded in the FIG. 3B) are loaded with the RBSs. During the second step, the subcarriers $C_2/C_4/C_6$ (shaded in the FIG. 3B) are loaded with the CEBSs because the bit loads of the subcarriers $C_2/C_4/C_6$ are set to zero in the BAT 310, while the subcarriers $C_1/C_3/C_5$ (not shaded in the FIG. 3B) are loaded with the RBSs. Consequently, the arrangement of the subcarriers loaded with CEBSs forms a comb pattern. A pattern for transmitting certain bit sequences in an OFDM signal describes the arrangement of the subcarriers that carries the CEBSs with respect to the frequency dimension and in the time dimension.

After the steps 1 and 2, the channel estimator 160, for example, can perform channel estimation for each subcarrier shown in FIGS. 3A-3B based on received CEBSs carried in the OFDM signal 320. Particularly, the channel estimator 160 can combine the channel estimation results of the first step and the second step to generate an overall channel estimation result including measures of all subcarriers.

Figures 3C, 3D:
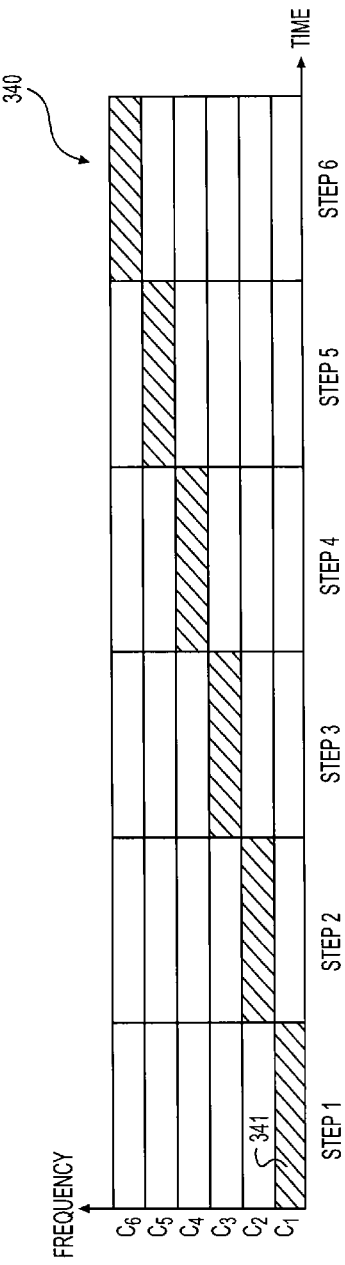

FIGS. 3C and 3D show a BAT 330 and an OFDM signal 340 that is adaptively modulated using the BAT 330. The BAT 330 is similar to the BAT 310 in FIG. 3A and has the same amount of subcarriers and the same original BLS as the BAT 310. However, a different channel estimation is initiated and performed using the BAT 330. As shown, the channel estimation includes six steps and corresponds to six different BLSs of the BAT 330. The six different BLSs of the BAT 330 correspond to the six columns labeled with "step 1" to "step 6". For each step, only one subcarrier is set with a bit load of a predetermined value, such as zero.

The OFDM signal 340 is also similar to the OFDM signal 320 in FIG. 3B but includes six areas each corresponding to a step of the channel estimation in FIG. 3C. As shown, only one subcarrier (shaded) carries a CEBS in each step, which is consistent with the BLSs in the BAT 330. For example, in step 1, the BLS in the column labeled with "step 1" in the BAT 330 is used for the adaptive modulation. Accordingly, the subcarrier $C_1$ corresponding to the block 341 in the area corresponding to the first step of the channel estimation carries a CEBS because the subcarrier $C_1$ is set with a bit load of zero in the BAT 330 during the first step. In contrast, the subcarriers $C_2$-$C_6$ in the area corresponding to the first step carry RBSs.

It is noted that different BLSs of a BAT during a channel estimation occupies different bandwidth of data transmission channel. The BLS describes the bit load for each subcarrier in a BAT in each step of a channel estimation including multiple steps. As described above, the BLS of each step during the channel estimation in the FIG. 3C example has fewer subcarriers that are set with a bit load of zero compared with that in the FIG. 3A example. For example, the BLS of each step in the BAT 330 has one subcarrier with a bit load of zero while the BLS of each step in the BAT 310 has three subcarriers with a bit load of zero. Consequently, channel estimation using the BAT 330 uses less bandwidth of the data transmission channel than using the BAT 310.

Compared with the channel estimation scheme using the probe frames, the channel estimation scheme using the BLSs of BATs has less effect on the bandwidth for data transmission. When using probe frames, the payload of the probe PHY frame is occupied by the bit sequence for channel estimation, thus causing a temporary pause of transmission of regular data, such as application data or management data encapsulated in the payload of a PHY frame. While when using BLSs of BATs, such as in the FIG. 3C example, bandwidth consumption of the channel estimation is much less compared with using probe frames, thus having less effect on the transmission of regular data.

It is further noted that patterns of the BLSs of a BAT used during a channel are not limited to the patterns described in the FIGS. 3A-3D examples, and can be arranged according to the requirements of various embodiments. In contrast, in the channel estimation using pilot sequences, the patterns for transmitting the pilot sequences are usually fixed.

FIG. 4 shows an exemplary BAT 410 that is used for a blind channel estimation according to an embodiment of the disclosure. The blind channel estimation uses the channel estimation scheme described above, but the bit loads of the subcarriers used for channel estimation are set to a non-predetermined value instead of a predetermined value. The non-predetermined value for a bit load is one of the values of the bit loads according to which the bit loader 152 loads RBSs to the subcarriers. In contrast, for the predetermined value, the bit loader 152 loads CEBSs to the subcarriers.

As shown in FIG. 4, the BAT 410 is similar to the BAT 310 shown in FIG. 3A. The original BLS of the BAT 410 are the same as that of the BAT 310. In addition, similar to the BAT 310, the BAT 410 includes two BLSs corresponding to the columns labeled with step 1 and step 2, and the two BLSs are used for a channel estimation performed in two steps. However, for each step, the bit loads of subcarriers whose bit loads are set to zero in the BAT 310 are set to one in the BAT 410, and accordingly, RBSs instead of CEBSs are loaded to the subcarriers with a bit load of one during the adaptive modulation operation. The channel estimator 160 at the receiver 125 can obtain the RBSs carried in the OFDM signal based on the BAT ID and the BLSs of the step 1 and the step 2, but does not know in advance what bit sequences the RBSs are. Channel estimation using RBSs without known bit sequences is referred to as blind channel estimation. During the blind channel estimation, the channel estimator 160 first make a decision of what bit sequence the received RBSs are, and subsequently, compares the received RBSs and the determined bit sequence to perform channel estimation.

It is noted that, compared with the blind channel estimation in the FIG. 4 example, the channel estimation using BLSs of BATs with a portion of subcarriers being set with a bit load of a predetermined value uses bit sequences known to the receiver side, thus having a higher accuracy of estimation of channel conditions. However, the blind channel estimation in the FIG. 4 example uses less bandwidth of data transmission than the channel estimation with bit loads set to a predetermined value in the BLS of the BATs.

FIG. 5 shows a BAT 510 using subcarrier grouping according to an embodiment of the disclosure. During the data transmission process described in the FIG. 1 example, BATs need to be communicated between the nodes 110 and 115. In addition, BATs need to be stored in the memories 140 and 145 at the transmitter 120 and the receiver 125, respectively. In order to reduce the overhead incurred by communication of BATs and the memory requirement, neighboring subcarriers in a BAT can be grouped together, referred to as subcarrier grouping, so that the size of BATs can be compressed. Specifically, the subcarrier grouping can be based on expected correlation of the bit loads of each subcarrier. For example, adjacent subcarriers are expected to have a similar behavior (e.g., similar SNRs) and thus similar bit loads, therefore they can be grouped together. With grouping of two subcarriers, size of a BAT can be reduced by a factor of two. In the FIG. 5 example, the BAT 510 includes ten subcarriers $C_1$-$C_8$ that are grouped into four groups having group indexes $G_1$-$G_4$. The first group $G_1$ includes two subcarriers $C_1$ and $C_2$ each having a bit load of three. The second group $G_2$ includes two subcarriers $C_3$ and $C_4$ each having a bit load of two. During the data transmission, the structure of the subcarrier grouping of the BAT 510 can be transmitted from the receiver 115 to the transmitter 110. During the subsequent channel estimation, only information of the BAT ID, group indexes and corresponding bit loads of each group is transmitted, thus communication overhead can be reduced.

In the FIG. 5 example, the channel estimation includes four steps, and a bit load of a subcarrier group is set to zero for each step. When performing bit loading in each step, the bit loader 152 can load a CEBS for each subcarrier in the group that has a bit load of zero. At the channel estimator 160, channel estimation is performed for each subcarrier in the group that has a bit load of zero in each step, and subsequently, new bit loads can be calculated at the bit load calculator 170.

FIG. 6 shows multiple BAT regions in alternating current (AC) cycles according to an embodiment of the disclosure. In the embodiment, power lines are used as transmission media between the nodes 110 and 115 in the FIG. 1 example. Variation of noise and interference in the power line media synchronizes with the AC cycle, thus SNRs of subcarriers in the OFDM signal varies according to the AC cycle. Accordingly, different BATs can be used for different time period in an AC cycle for optimization of transmission efficiency. In the FIG. 6 example, the AC cycle is divided into two types of intervals 610 and 620, and each interval is referred to as a BAT region. The first type of intervals corresponds to the time periods around the peaks of the AC cycle, and the second type of intervals corresponds to the time periods around the zero crossings of the AC cycle. Each interval 610 or 620 is associated with a BAT, such as BAT 1 or BAT 2. When a BAT, such as the BAT 1 or BAT 2, is generated, the starting point and ending point of the BAT region for the BAT with respect to the AC cycle are defined and associated with the BAT. Thus, the bit loader 152, for example, chooses the BAT valid for a specific BAT region based on the AC cycle.

In an embodiment of power line communication, at the initial stage of the data communication between the nodes 110 and 115, multiple BATs can be established at the receiver 125 for different BAT regions based on certain channel estimation scheme, such as using probe frames. Later, as channel conditions change, the Rx estimation controller 135 can start channel estimations using BLSs of the BATs to update the BATs. For example, the Rx estimation controller 135 can choose the BAT 1 that is valid in the BAT regions 610 to start a channel estimation. The channel estimation can include multiple steps. The BAT ID and the BLS can be included in a BLS updating message and transmitted to the estimation controller 130 as well as to the channel estimator 160 in each step of the channel estimation. The bit loader 152 chooses the BAT 1 to perform adaptive modulation during the BAT regions 610 in the AC cycle. The channel estimator 160 selects the sub-symbols of the CEBSs for each subcarrier based on the BAT ID and the BLS, and calculates a SNR for each subcarrier. The steps of the channel estimation may cross over multiple BAT regions in the AC cycle. After the last step of the channel estimation, the channel estimator 160 can combine the SNRs calculated in each step into one result that is transmitted to the bit load calculator 170. Consequently, the bit load calculator 170 can calculate a new BLS for the BAT regions 610.

It is noted that, for the purpose of estimating the SNR for each subcarrier to update a BAT in power line communication, the channel estimation scheme using BLSs of a BAT is more accurate than the channel estimation scheme using probe frames. According to an aspect of the disclosure, when using probe frames, it is difficult to control the timing of the probe frames to match the probe frames with the BAT region for which the BAT is to be regenerated. Consequently, SNRs calculated based on the bit sequence included in the probe frames may not reflect the channel conditions of the BAT region. But when using BLSs of the BAT, because the BAT is used exactly in the BAT region for which the BAT is defined, the SNRs obtained reflects the channel conditions corresponding to the BAT region.

Figure 7:
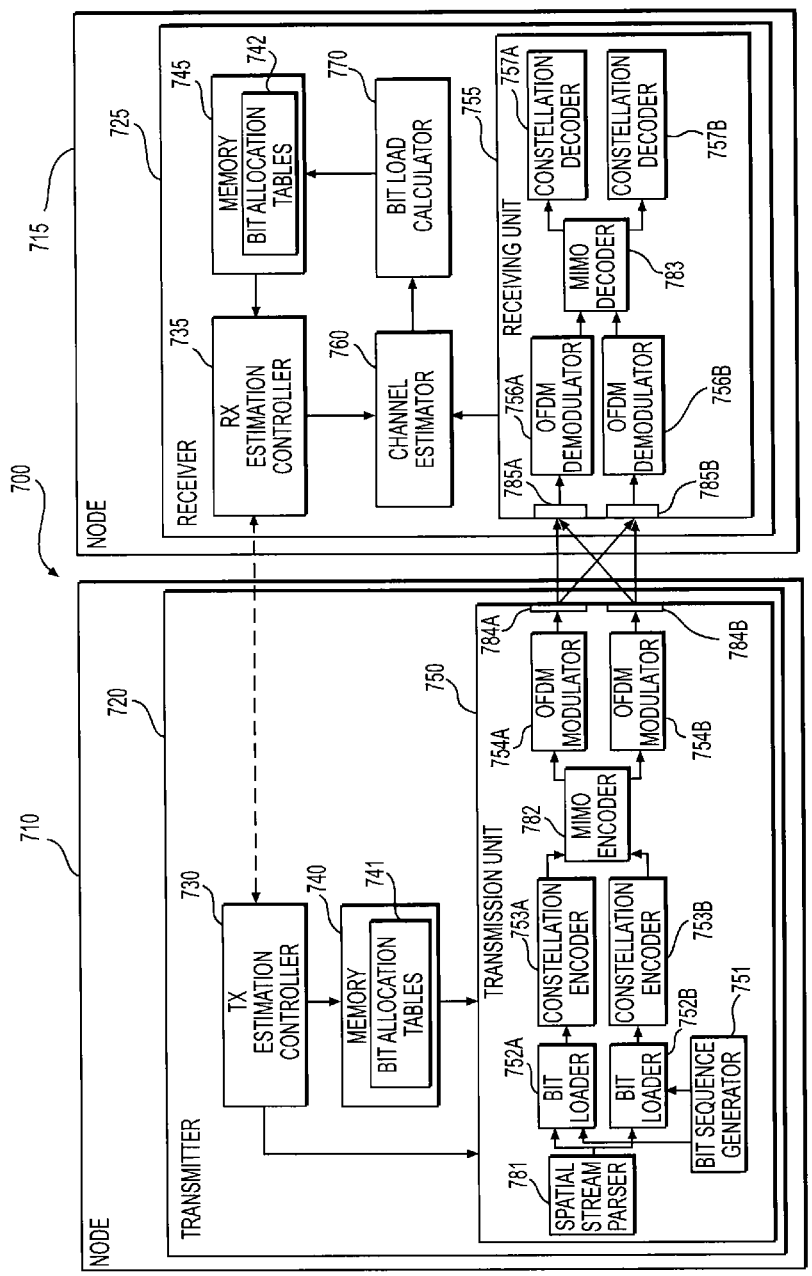
FIG. 7 shows a communication network according to some embodiments of the disclosure.

FIG. 7 shows a communication network 700 according to some embodiments of the disclosure. The network 700 includes two nodes 710 and 715. The nodes 710 and 715 uses multiple-input and multiple-output (MIMO) for data transmission between each other and the channel estimation scheme using BLSs of BATs described above for channel estimation.

The node 710 includes a transmitter 720 that includes a Tx estimation controller 730, a memory 740 for storing one or more BATs 741, and a transmission unit 750. The transmission unit 750 includes a spatial stream parser 781, two bit loaders 752a and 752b, two constellation encoders 753a and 753b, a MIMO encoder 782, two OFDM modulators 754a and 754b, a bit sequence generator 751, and two Tx ports 784a and 784b. The node 725 includes a Rx estimation controller 753, a channel estimator 760, a bit load calculator 770, a memory 745 for storing one or more BATs, and a receiving unit 755. The receiving unit 755 includes two Rx ports 785a and 785b, two OFDM demodulators 756a and 756b, a MIMO decoder 783, and two constellation decoders 757b. The above mentioned elements are coupled together as shown in FIG. 7.

The functions of the elements included in the network 700, except the spatial stream parser 781, the MIMO encoder 782, the MIMO decoder 783, the Tx ports 784a and 784b, and the Rx ports 785a and 785b, are similar to the functions of the counterpart elements included in the network 100 in FIG. 1. In addition, the nodes 710 and 715 communicate with each other using adaptive OFDM modulation schemes and BATs in a way similar to the FIG. 1 example.

However, different from the FIG. 1 example, the nodes 710 and 715 use MIMO technique to transmit data and accordingly some elements for MIMO operations, such as spatial stream parser 781, the MIMO encoder 782, the MIMO decoder 783, the Tx ports 784a and 784b, and the Rx ports 785a and 785b, are added in the nodes 710 or 715 in the FIG. 7 example. In addition, the bit loaders 752a and 752b, the constellation encoders 753a and 753b, the OFDM modulators 754a and 754b, the OFDM demodulators 756a and 756b, and the constellation decoders 757a and 757b change from one element as in FIG. 1 to two elements as in FIG. 7 to support simultaneous processing of two data streams using MIMO.

Generally, MIMO refers to a technique for sending and receiving more than one data signal on the same wired or wireless channel at the same time via multiple transmitters and receivers. For example, a communication system using MIMO schemes typically includes $N_T$ transmission ports and $N_R$ reception ports, and at least one of $N_T$ and $N_R$ is greater than one. At a given time instant, $N_T$ transmission data signals are transmitted from the $N_T$ ports, respectively, over the same frequency band, and each of the $N_R$ reception ports receives $N_T$ transmission data signals. MIMO can be used in two modes: spatial diversity mode or spatial multiplexing mode. When used in spatial diversity mode, replicas of the same signal are transmitted through different transmission ports to combat multipath fading of the signal. While when used in spatial multiplexing mode, multiple signals each carrying a different data stream are transmitted through different transmission ports, which is exploited to improve data throughput.

In the FIG. 7 example, the transmitter 720 and the receiver 725 can choose one of the two MIMO modes described above on a per subcarrier basis. When the spatial diversity mode is chosen for a subcarrier, one group of bits is associated with the subcarrier at the transmission unit 750 and transmitted through the two Tx ports, while when a spatial multiplexing mode is chosen for a subcarrier, multiple groups of bits are associated with the subcarrier at the transmission unit 750 and transmitted through the two Tx ports.

In an embodiment, one or more BATs 741 are stored in the memory 740. The BATs can include MIMO mode information. In addition, a subcarrier in the BATs can have multiple bit loads defined for the subcarrier. For example, each subcarrier in the BATs can have an indicator indicative of a MIMO mode chosen for the subcarrier. In addition, for each subcarrier having an indicator indicative of a spatial multiplexing mode, different bit loads corresponding to different data streams are associated with the subcarrier. Accordingly, a bit load of the subcarrier is equal to the sum of the multiple bit loads corresponding to different data streams.

In an embodiment, the transmitter 720 and the receiver 735 choose the MIMO mode for each subcarrier in a BAT based on channel conditions between the two nodes 710 and 715. Specifically, two channel estimations are performed for each subcarrier using the channel estimation scheme described above. The first channel estimation is performed when a first MIMO mode such as the spatial diversity mode is chosen for a subcarrier in the BAT, and the second channel estimation is performed when a second MIMO mode such as the spatial multiplexing mode is chosen for the subcarrier in the BAT. Subsequently, based on the channel estimation results, a first bit load corresponding to the first MIMO mode and a second bit load corresponding to the second MIMO mode are calculated separately based on the two channel estimations. Thereafter, the first bit load is compared with the second bit load, and a MIMO mode corresponding to the higher bit load is chosen for the subcarrier. In a similar way, MIMO modes for each subcarrier in the BAT can be determined. Subsequently, a higher communication bandwidth can be obtained based on the choices of the MIMO modes for each subcarrier.

The functions of the elements and the processes performed in the transmitter 720 and the receiver 725 are described in detail below. It is noted that the functions and processes in the transmitter 720 and the receiver 725 that are similar to the functions and processes described in the FIG. 1 example are omitted for brevity.

At the transmission unit 750, the spatial stream parser 781 receives data encapsulated in the pay load of PHY frames and processes the data on a per sub carrier basis according to a BLS in a BAT. For each subcarrier for which the spatial multiplexing mode is chosen, the spatial stream parser 781 separates the data into two groups of bits according to the two bit loads corresponding to different data streams in the BAT. For each subcarrier for which the spatial diversity mode is chosen, the spatial stream parser 781 passes a group of bits to one of its output according to the bit loads in the BAT.

For the subcarrier for which the spatial multiplexing mode is chosen, the two groups of bits are then processed at the bit loaders 752*a* and 752*b* and the constellation encoders 753*a* and 753*b*, respectively and successively, according to the two bit loads corresponding to different data streams. In an embodiment, bit loads of subcarriers used for channel estimation are set to a predetermined value in the BAT, such as zero, and CEBSs are generated from the bit sequence generator 751 and associated with the subcarriers. The two groups of bits are then received at the MIMO encoder 782.

For the subcarrier for which the spatial diversity mode is chosen, the group of bits is processed at, for example, the bit loader 752*a* and constellation encoder 753*a*, and transmitted to the MIMO encoder 782.

The MIMO encoder 782 converts the one or two data streams coming from the constellation encoders 753*a* and 753*b* into two transmission streams at its output. The conversion operation is on a per subcarrier basis. On each subcarrier, the MIMO encoder 782 maps a single or a pair of sub-symbols corresponding to the one or two data streams to a modified pair of signals according to a mapping matrix. For different subcarriers, different mapping matrices may be used. The mapping matrices are based on different MIMO schemes, such as space-time or space-frequency coding schemes for the spatial diversity mode and eigenbeamforming or Bell Laboratories layered space-time (BLAST) coding for the spatial multiplexing mode.

The OFDM modulators 754*a* and 754*b* receive the two transmission streams from the MIMO encoder 782, and transform the two transmission streams from frequency domain symbols to time domain samples that are then processed by two analog front ends (AFEs) (not shown) and sent to the two Tx ports 784*a* and 784*b*. From the two Tx ports 784*a* and 784*b*, the two transmission streams are transmitted to the two Rx ports 785*a* and 785*b* at the receiving unit 755.

At the receiving unit 755, two data signals from the two Rx ports 785*a* and 785*b* are transmitted to the OFDM demodulators 756*a* and 756*b* and then transformed into two reception streams. The two reception streams are then received and processed at the MIMO decoder 783. The MIMO decoder 783 operates on per subcarrier basis and, on each subcarrier, transforms the two reception streams into two groups of sub-symbols for the subcarrier in the spatial multiplexing mode or one group of sub-symbols for the subcarrier in the spatial diversity mode. For the subcarrier in the spatial multiplexing mode, the two groups of sub-symbols are then processed at the two constellation decoders 757*a* and 757*b*, respectively, where the sub-symbols of each subcarrier are mapped to groups of bits. Consequently, two groups of bits are generated at the output of the constellation decoders 757*a* and 757*b* and are transmitted to other elements for further processing, such as combination of the two groups of bits with other groups of bits corresponding to other subcarriers into one stream, FEC decoding and de-scrambling operations. For the subcarrier in the spatial diversity mode, the group of sub-symbols is processed at, for example, the constellation decoder 757*a* and consequently one group of bits is generated and transmitted to other elements at the receiver 755 for further processing. The MIMO decoder 783 uses MIMO decoding schemes corresponding to the MIMO encoding schemes used at the MIMO encoder 782 for its data transformation operation.

In an embodiment, in order to determine a MIMO mode for each subcarrier used for the data transmission between the two nodes 710 and 715, the receiver 725 together with the transmitter 720 successively perform two channel estimations using channel estimation schemes described above. The first channel estimation for a first MIMO mode is performed during a first phase when the first MIMO mode is chosen for all subcarriers, while the second channel estimation for a second MIMO mode is performed during a second phase when the second MIMO mode is chosen for all subcarriers. In an embodiment, the channel estimations are triggered by a change of channel conditions between the two nodes. In another embodiment, the channel estimations are performed at the initial stage of the data communication.

During the first phase, the first channel estimation for the first MIMO mode, for example, the spatial diversity mode, is performed. As described above, the first channel estimation may include multiple steps. In each step, the Rx estimation controller 735 sends a bit load setting (BLS) updating message to the Tx estimation controller 730. The BLS updating message can include a BAT ID of a BAT, a BLS of the BAT in which the first MIMO mode is chosen for all subcarriers. The BLS of the BAT indicates the subcarriers that have a bit load of a specific value, either a predetermined value or a non-predetermined value. In each step, the Tx estimation controller 730 receives the BLS updating message, and subsequently update the BAT stored in the memory 740 with the BLS carried in the BLS updating message. In addition, the Tx estimation controller 730 can inform the transmission unit 750 the update of the BAT and the MIMO mode for the channel estimation. Accordingly, the transmission unit 750 starts to use the updated BAT and operate in the MIMO mode for channel estimation. Consequently, bit sequences, either CEBSs or RBSs are included in the subcarriers having a bit load of the specific value in the BAT, and the BAT ID of the updated BAT is carried in the PHY frame header.

At the receiver 725, for each step, the Rx estimation controller 735 also transmits the BLS updating message to the channel estimator 760, thus the channel estimator 760 knows which BAT is used for the channel estimation. Based on the BAT ID carried in the PHY frame, the channel estimator 760 obtains the sub-symbols corresponding to the bit sequences carried in the subcarriers with a bit load of the specific value. For example, the channel estimator 760 can receive sub-symbols from the output of the MIMO decoder 783, and select the sub-symbols corresponding to the bit sequences. Subsequently, the channel estimator 760 calculates SNRs for the subcarriers with a bit load of the specific values.

During the second phase, the second channel estimation for the second MIMO mode, for example, the spatial multiplexing mode, is performed. The second channel estimation is similar to the first channel estimation, however, two bit loads corresponding to two different data streams are defined for each subcarrier in the BAT. Therefore, for a subcarrier under a channel estimation in one of the multiple steps of the channel estimation, the subcarrier is set with two specific values corresponding to the two different data streams. Consequently, the channel estimator 760 calculates two SNRs corresponding to the two different data streams for the subcarrier.

After the two channel estimations described above, the SNRs for each subcarrier for the two different MIMO modes are obtained and transmitted to the bit load calculator 770. The bit load calculator 770 calculates a first BLS for the first MIMO mode and a second BLS for the second MIMO mode, and stores the calculated results in the memory 742. In the second BLS for the second MIMO mode that is the spatial multiplexing mode in the example, each subcarrier has two bit loads corresponding to the two different data streams.

Subsequently, the Rx estimation controller 735 can compare the bit load of a subcarrier in the first BLS corresponding to the first MIMO mode with the bit load of the same subcarrier in the second BLS corresponding to the second MIMO mode to determine a MIMO mode for the subcarrier. In the above example, the second MIMO mode is spatial multiplexing mode, and accordingly, the bit load of the same subcarrier in the second BLS is equal to the sum of the multiple bit loads corresponding to the different data streams. The MIMO mode with a higher bit load is selected for the subcarrier. For example, the first MIMO mode is chosen for the subcarrier if the bit load of the subcarrier in the first BLS is higher than that in the second BLS. Finally, the Rx channel 735 sends a BAT updating message to the Tx estimation controller 730. The BAT updating message can include the BAT ID, the selected MIMO mode for each subcarrier, and one or more bit loads corresponding to the selected MIMO mode. Accordingly, the transmitter 720 and the receiver 725 start to operate based on the updated BAT.

It is noted that, although the above description refers two data streams in the spatial multiplexing mode of MIMO operation, the scope of the disclosure is not limited to two data streams and the aspect of the disclosure can be applied for situations where more than two data streams are processed in the spatial multiplexing mode.

Figure 8:
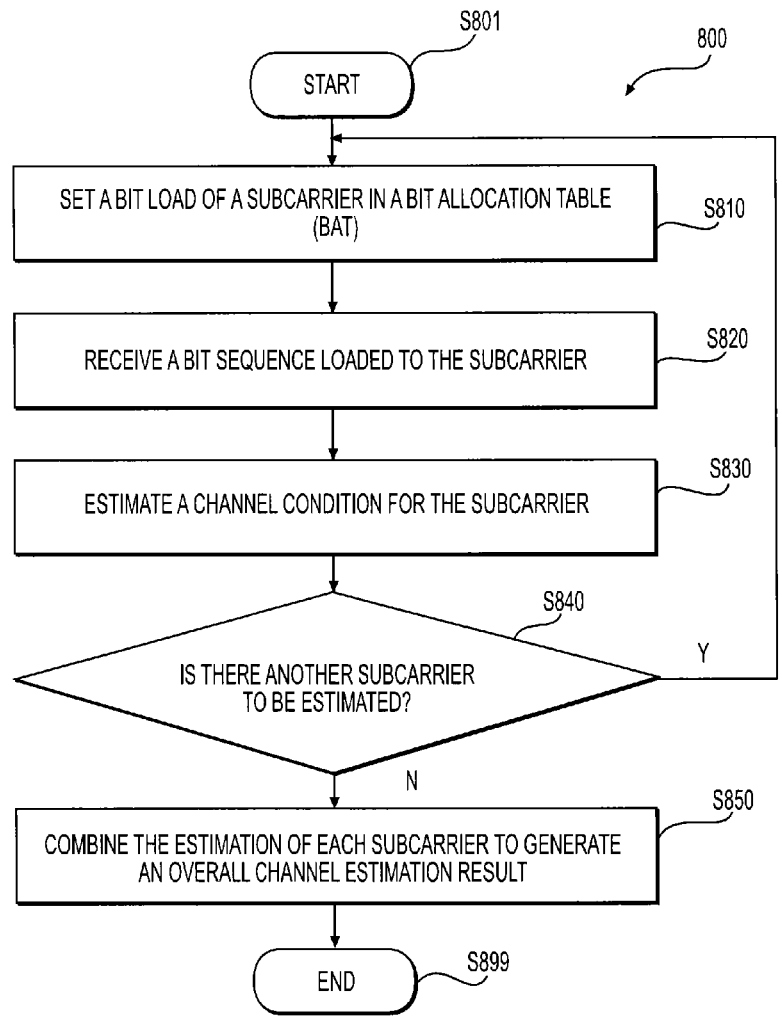
FIG. 8 shows a flow chart of a channel estimation process according to some embodiments of the disclosure.

FIG. 8 shows a flow chart of a channel estimation process 800 according to some embodiments of the disclosure. The channel estimation process 800 starts at S801 and proceeds to S810. The process 800 can be implemented in software, firmware, hardware, or any combination thereof.

At S810, a BLS updating message is generated in order to set a bit load of a subcarrier in a BAT at the transmitter side to a specific value (e.g., a predetermined value or a non-predetermined value). For example, triggered by a change of channel conditions, an Rx estimation controller at a receiver side starts the channel estimation process 800. The Rx estimation controller first chooses a BAT to be updated and a portion of the subcarriers in the BAT and then generates a BLS updating message including a BAT ID of the BAT and a BLS of the portion of subcarriers in the BAT. The BLS specifies the subcarriers that are chosen and set with a bit load of the specific value. Then, the BLS updating message is sent to a transmitter. For example, the Rx estimation controller sends the BLS updating message to a Tx estimation controller at the transmitter side. Subsequently, the Tx estimation controller updates the BLS of the BAT at the transmitter side, for example, set the bit loads to the specific values for subcarriers specified in the BLS updating message. Next, the updated BAT is used for data transmission, and PHY frames carrying bit sequences in the subcarriers with bit loads of the specific values in the BAT are transmitted from the transmitter side to the receiver side. The BLS updating message is also sent to a channel estimator at the receiver.

At S820, the bit sequences loaded to the subcarriers with bit loads of the specific value are received at a receiving unit at the receiver side. In an embodiment, the receiver provides the BAT ID carried in the PHY frame header and the sub-symbols generated from a FFT in the receiving unit to the channel estimator at the receiver side.

At S830, measurements of channel conditions are calculated for the subcarriers specified in the BLS updating message based on the bit sequences received at the receiver side. For example, the channel estimator recognizes the PHY frame which carries the bit sequences for channel estimation according to the BAT ID carried in the PHY header and the BAT ID included in the BLS updating message, and accordingly selects the bit sequences (in the form of sub-symbols) according to the BLS included in the BLS updating message. Subsequently, the channel estimator calculates SNRs for each subcarrier specified in the BLS updating message.

At S840, the Rx estimation controller determines if there are other subcarriers in the BAT that are not chosen at S810. If the determination is positive, the process 800 proceeds to S810. Otherwise, the process 800 proceeds to S850.

At S850, channel estimations of different portions of the subcarriers are combined together to generate an overall channel estimation result for subcarriers in the BAT. The process 800 proceeds to S899 and terminates at S899.

Figure 9:
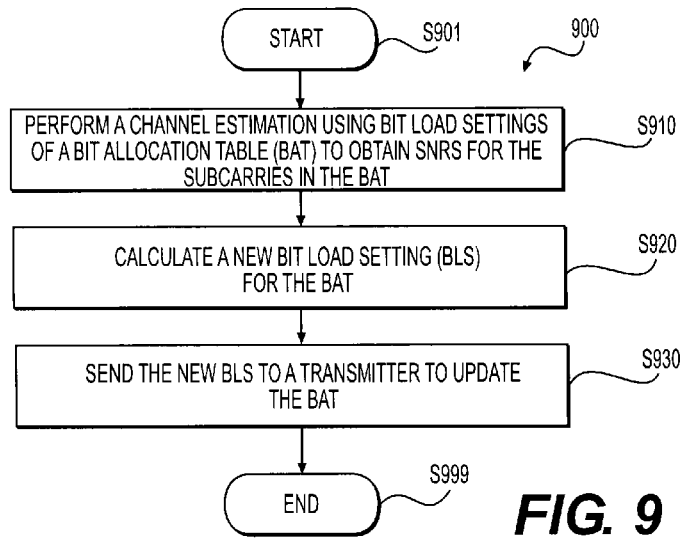
FIG. 9 shows a flow chart of a BAT updating process according to an embodiment of the disclosure.

FIG. 9 shows a flow chart of a BAT updating process 900 according to an embodiment of the disclosure. The process 900 can be implemented in software, firmware, hardware, or any combination thereof. The BAT updating process 900 starts at S901 and proceeds to S910. At S910, a channel estimation process using BLSs of a BAT is performed to obtain SNRs for subcarriers of the BAT that is to be updated. The channel estimation process is similar to the channel estimation process 800 described above.

At S920, a new BLS is calculated for the BAT to be updated. For example, a bit load calculator calculates a new BLS for updating the BAT based on the SNRs of each subcarrier in the BAT obtained at S910. A copy of the BAT stored in a memory can be updated with the new BLS.

At S930, the new BLS for updating the BAT is transmitted to a transmitter to update the BAT stored at the transmitter. For example, a receiver transmits the new BLS together with the BAT ID of the BAT to be updated to a transmitter. The transmitter then updates the BAT stored in a memory with the new BLS. The process 900 proceeds to S999 and terminates at S999.

Figure 10:
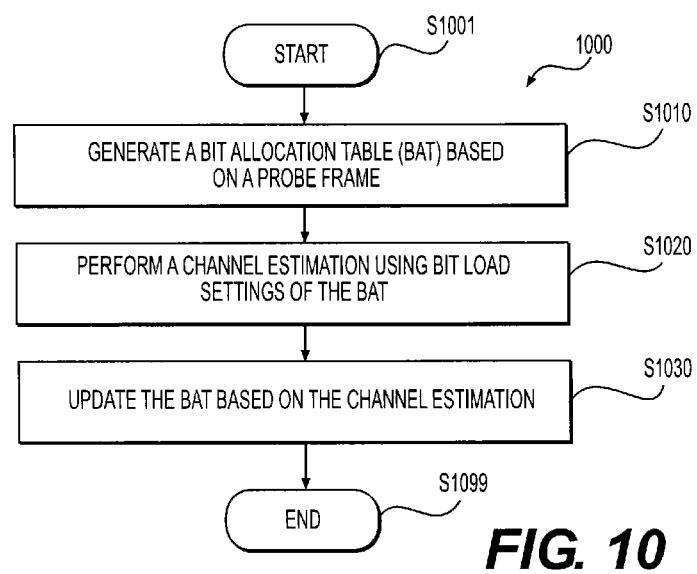
FIG. 10 shows a flowchart of a process 1000 that combines two channel estimation schemes according to an embodiment of the disclosure.

FIG. 10 shows a flowchart of a process 1000 that combines two channel estimation schemes according to an embodiment of the disclosure. The process 1000 can be implemented in software, firmware, hardware, or any combination thereof. The process 1000 starts at S1001 and proceeds to S1010.

At S1010, a BAT is generated based on a channel estimation scheme using a probe frame. For example, at an initial stage of communication between a first node and a second node in a communication network, a receiver at the second node can establish a BAT using bit sequences carried in a probe frame. Specifically, a channel estimator can use the received sub-symbols corresponding to the bit sequences carried in the probe frame to calculate the SNRs for each subcarrier used in an OFDM signal. A bit load calculator can subsequently calculate bit loads for each subcarrier based on the SNRs calculated by the channel estimator. Then, a BAT including the calculated bit loads can be generated and stored into a memory. Finally, the receiver transmits the BAT to a transmitter at the first node where the BAT can be stored in a memory and used for subsequent adaptive modulation operation.

At S1020, a channel estimation is performed based on a channel estimation scheme using BLSs of the BAT that is generated at S1010. For example, after the initial stage of the communication, a change of the channel conditions between the nodes 120 and 125 takes place, and the BAT needs to be updated based on the new channel conditions. In order to update the BAT, the channel estimation is performed to obtain the SNRs of subcarriers in the BAT. The BLSs of the BAT are used in the channel estimation.

At S1030, based on the SNRs obtained at S1020, a new BLS is calculated at the bit load calculator 170. Then, the new BLS is used to update the BATs stored at the transmitter and the receiver. The process 1000 proceeds to S1020 and terminates at S1020.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A receiver, comprising:
a receiving estimation controller circuit configured to set a bit load of a subcarrier in a bit allocation table (BAT) at a transmitter to a predetermined value indicating the subcarrier to be used for channel estimation;
a receiving circuit configured to receive, from the transmitter, bit sequences loaded to subcarriers based on the BAT; and
a channel estimator circuit configured to select from the received bit sequences a bit sequence loaded to the subcarrier having the bit load that is set to the predetermined value and estimate a channel condition based on the selected bit sequence.

2. The receiver of claim 1, wherein the bit sequence loaded to the subcarrier having a bit load that is set to the predetermined value is a bit sequence known to the receiver.

3. The receiver of claim 1, wherein the receiving estimation controller circuit is configured to set multiple bit loads of multiple subcarriers in the BAT at the transmitter to the predetermined value to perform channel estimations for each of the multiple subcarriers.

4. The receiver of claim 3, wherein,
the channel estimator circuit is configured to calculate a signal-to-noise ratio (SNR) for each of the multiple subcarriers in the BAT to estimate the channel condition for the respective subcarrier;
the receiver further includes a bit load calculator circuit that is configured to calculate a bit load for each of the multiple subcarriers in the BAT based on the respective SNRs calculated by the channel estimator circuit to generate a bit load setting (BLS) for the BAT; and
the receiving estimation controller circuit is further configured to transmit BLS to the transmitter to update the BAT at the transmitter.

5. The receiver of claim 1, wherein the receiving estimation controller circuit is configured to send a BLS updating message to the transmitter to set the bit load of the subcarrier in the BAT at the transmitter, the BLS updating message including a BAT identification of the BAT and a BLS specifying the subcarrier in the BAT.

6. The receiver of claim 1, wherein the receiving estimation controller circuit is configured to set bit loads of subcarriers in a subcarrier group of the BAT that uses subcarrier grouping to perform the channel estimation for the subcarriers.

7. The receiver of claim 1, wherein the receiving estimation controller circuit is configured to set a next bit load of a next subcarrier in the BAT at the transmitter to the predetermined value to perform in a next channel estimation for the next subcarrier.

8. The receiver of claim 1, wherein the channel estimator circuit is configured to select from the received bit sequences the bit sequence loaded to the subcarrier having the bit load that is set to the predetermined value based on a BAT identification of the BAT and a BLS specifying the subcarrier in the BAT, the BAT identification of the BAT and the BLS being received from the receiving estimation controller circuit.

9. The receiver of claim 1, wherein,
the receiving estimation controller circuit is configured to set the bit load of the subcarrier in the BAT at the transmitter to the predetermined value indicating the subcarrier to be used for channel estimation to perform a first channel estimation corresponding to a first multiple-input and multiple-output (MIMO) mode and set the bit load of the subcarrier in the BAT at the transmitter to the predetermined value indicating the subcarrier to be used for channel estimation to perform a second channel estimation corresponding to a second MIMO mode;
the channel estimator circuit is configured to calculate a first SNR for the subcarrier in BAT corresponding to the first channel estimation and a second SNR for the subcarrier in the BAT corresponding to the second channel estimation; and
the receiver further includes a bit load calculator circuit that is configured to calculate a first bit load of the subcarrier in the BAT corresponding to the first MIMO mode based on the first SNR and a second bit load of the subcarrier in the BAT corresponding to the second MIMO mode based on the second SNR;
wherein the receiving estimation controller circuit is configured to choose the first MIMO mode for the subcarrier in the BAT when the first bit load of the subcarrier in the BAT calculated based on the first channel estimation is higher than the second bit load of the subcarrier in the BAT calculated based on the second channel estimation.

10. A method, comprising:
setting, at a receiver, a bit load of a subcarrier in a bit allocation table (BAT) at a transmitter to a predetermined value indicating the subcarrier to be used for channel estimation;
receiving, from the transmitter, bit sequences loaded to subcarriers based on the BAT;
selecting from the received bit sequences a bit sequence loaded to the subcarrier having the bit load that is set to the predetermined value; and
estimating a channel condition based on the selected bit sequence.

11. The method of claim 10, wherein the bit sequence loaded to the subcarrier having the bit load that is set to the predetermined value is a bit sequence known to the receiver.

12. The method of claim 10, further comprising:
setting multiple bit loads of multiple subcarriers in the BAT at the transmitter to the predetermined value to perform channel estimations for each of the multiple subcarriers.

13. The method of claim 12, further comprising:
calculating a signal-to-noise ratio (SNR) for each of the multiple subcarriers in BAT to estimate the channel condition for the respective subcarrier; calculating a bit load for each of the multiple subcarriers in the BAT based on the SNRs to generate a bit load setting (BLS) for the BAT; and
transmitting the BLS to the transmitter to update the BAT at the transmitter.

14. The method of claim 10, wherein setting the bit load of the subcarrier in the BAT at the transmitter includes sending a BLS updating message to the transmitter, the BLS updating message including a BAT identification of the bit BAT and a BLS specifying the subcarrier in the BAT.

15. The method of claim 10, further comprising:
setting bit loads of subcarriers in a subcarrier group of the BAT that uses subcarrier grouping to perform the channel estimation for the subcarriers.

16. The method of claim 10, further comprising:
setting a next bit load of a next subcarrier in the BAT at the transmitter to the predetermined value perform a next channel estimation for the next subcarrier.

17. The method of claim 10, wherein selecting from the received bit sequences the bit sequence loaded to the subcarrier having the bit load that is set to the predetermined value includes selecting the bit sequence loaded to the subcarrier based on a BAT identification of the BAT and a BLS specifying the subcarrier in the BAT.

18. The method of claim 10, further comprising:
setting the bit load of the subcarrier in the BAT at the transmitter to the predetermined value to perform a first channel estimation corresponding to a first multiple-input and multiple-output (MIMO) mode;
setting the bit load of the subcarrier in the BAT at the transmitter to the predetermined value to perform a second channel estimation for the subcarrier corresponding to a second MIMO mode;
calculating a first SNR for the subcarrier in BAT corresponding to the first channel estimation and a second SNR for the subcarrier in BAT corresponding to the second channel estimation;
calculating a first bit load of the subcarrier in the BAT corresponding to the first MIMO mode based on the first SNR and a second bit load of the subcarrier in the BAT corresponding to the second MIMO mode based on the second SNR; and
selecting the first MIMO mode for the subcarrier in the BAT when the first bit load of the subcarrier in BAT corresponding to the first MIMO mode is higher than the second bit load of the subcarrier in the BAT corresponding to the second MIMO mode.

* * * * *